(12) United States Patent
Ekman

(10) Patent No.: US 8,382,468 B2
(45) Date of Patent: Feb. 26, 2013

(54) METHOD AND DEVICE FOR COMBUSTION OF SOLID PHASE FUEL

(75) Inventor: Tomas Ekman, Saltsjö-Boo (SE)

(73) Assignee: AGA AB, Lidingo (SE)

( * ) Notice: Subject to any disclaimer, the term of this patent is extended or adjusted under 35 U.S.C. 154(b) by 564 days.

(21) Appl. No.: 12/427,953

(22) Filed: Apr. 22, 2009

(65) Prior Publication Data

US 2009/0263752 A1    Oct. 22, 2009

(30) Foreign Application Priority Data

Apr. 22, 2008  (SE) ........................................ 0800919

(51) Int. Cl.
*F24J 7/00*   (2006.01)
(52) U.S. Cl. ......... 431/4; 431/8; 431/9; 431/10; 431/12; 431/160; 431/350; 110/243; 110/265; 110/267; 110/327; 110/342
(58) Field of Classification Search ................ 431/4, 10, 431/12, 8, 160, 350, 9; 110/267, 327, 342, 110/346, 243, 265
See application file for complete search history.

(56) References Cited

U.S. PATENT DOCUMENTS

| 4,865,542 | A | * | 9/1989 | Hasenack et al. | ............ 431/160 |
| 4,911,637 | A | * | 3/1990 | Moore et al. | ...................... 431/8 |
| 5,242,295 | A | * | 9/1993 | Ho | .................. 431/10 |
| 5,266,024 | A | * | 11/1993 | Anderson | ........................ 431/11 |
| 5,567,141 | A | * | 10/1996 | Joshi et al. | ........................ 431/8 |
| 2007/0231761 | A1 | * | 10/2007 | Rosen et al. | .................. 431/350 |
| 2007/0295250 | A1 | * | 12/2007 | Bool et al. | ..................... 110/342 |

* cited by examiner

*Primary Examiner* — Avinash Savani
(74) *Attorney, Agent, or Firm* — Young & Thompson

(57) ABSTRACT

Method for combusting a solid phase fuel, where the fuel is caused, by the help of a non-pneumatic feeding element (11), to be fed to an inlet opening (11a) in a burner device (10) having a first inlet (13a) for the oxidant through which an oxidant is caused to flow via a first supply conduit (13). The first inlet (13a) for oxidant is caused to be arranged in the form of an opening surrounding the inlet opening (11a), in that the oxidant is caused to flow out through the opening (13a) with a velocity of at least 100 m/s, through a burner pipe (16) and out through a burner orifice (17) to a combustion space (18), so that the oxidant by ejector action causes the fuel to be conveyed through the burner pipe (16) and out through the burner orifice (17).

17 Claims, 1 Drawing Sheet

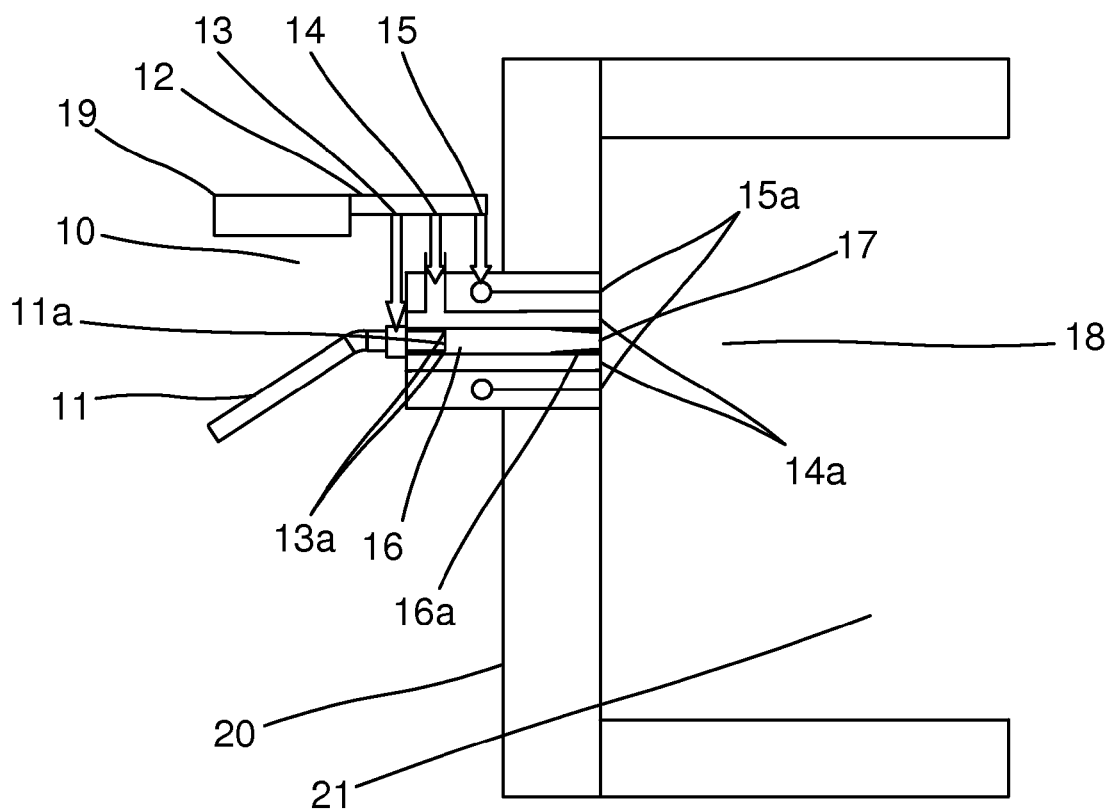

METHOD AND DEVICE FOR COMBUSTION OF SOLID PHASE FUEL

The present invention relates to a method and a device for combustion of solid phase fuel. More precisely, the invention relates to such combustion in a burner device using an oxidant with high oxygen concentration.

BACKGROUND OF THE INVENTION

When conventionally combusting solid phase fuel in industrial burners, a pneumatic system is often used, comprising a carrier gas for conveying the solid phase fuel from an inlet to the place for combustion. For example, the fuel may be in the form of a powder, such as pulverised coal, and may be impelled by the motion of the carrier gas. Frequently, the carrier gas is constituted by air or nitrogen. Such combustion systems may for example be used for heating industrial furnaces.

One problem with such an arrangement is that the carrier gas constitutes a substantial part of the gas flow in the combustion device. Consequently, large amounts of ballast gas, for example in the form of nitrogen, must be heated, which leads to deteriorated efficiency.

Furthermore, it would be desirable to use solid phase fuels together with oxyfuel combustion devices, in other words such devices where the oxidant has a large oxygen concentration. One problem with such combustion is that flame temperatures locally become very elevated. In combination with the large amounts of nitrogen present in the combustion zone, this results in elevated levels of $NO_x$ in the combustion gases, something which is not desirable because of, among other things, regulatory and environmental concerns. At the same time, it has proven to be very difficult to adapt a conventional combustion device for solid phase fuel so that dilution of the fuel with furnace gases can take place, for the purpose of achieving a so called flameless combustion, that is combustion with such a diffuse combustion zone so that a visible flame is essentially absent, and thereby achieving lower combustion temperatures.

Thus, it would be desirable to achieve a way to efficiently combust solid phase fuel the combustion products of which contains low levels of $NO_x$.

SUMMARY OF THE INVENTION

The present invention solves the above described problems.

Thus, the invention relates to a method for combusting a solid phase fuel, where the fuel is caused, by the help of a non-pneumatic feeding means, to be fed to an inlet opening in a burner device, where the burner device is caused to comprise a first inlet for the oxidant through which an oxidant is caused to flow via a first supply conduit, and is characterised in that the first inlet for oxidant is caused to be arranged in the form of an opening surrounding the inlet opening, in that the oxidant is caused to flow out through the opening with a velocity of at least 100 m/s, through a burner pipe and out through a burner orifice to a combustion space, so that the oxidant by ejector action causes the fuel to be conveyed through the burner pipe and out through the burner orifice.

Furthermore, the invention relates to a device of the type and with essentially the features according to claim 13.

BRIEF DESCRIPTION OF THE DRAWINGS

The invention will now be described in detail, with reference to exemplifying embodiments of the invention and to the appended drawing, where:

FIG. 1 is a schematic view of a burner device according to the present invention.

DETAILED DESCRIPTION OF THE PREFERRED EMBODIMENTS

FIG. 1 shows a burner device 10 according to the present invention, suitable for applying a method according to the present invention. The burner device 10 is mounted in the wall of an industrial furnace 20, and is directed so that a combustion space 18 associated with the burner device 10 is arranged in the heated volume 21 of the furnace 20. The industrial furnace 20 may be used for heating various materials, for example glass, steel, non ferrous metals and ceramic materials. Moreover, it is possible to use a burner device according to the present invention in for example heating, electric generation or thermal power plants, in which the heat from the burner device 10 is used, for example, as municipal heating and/or is converted into electricity.

A feeding means 11 in the form of a screw feeder or corresponding is arranged to feed a predetermined amount of solid phase fuel, such as for example pulverised coal, to an inlet opening 11a, arranged inside the burner device 10. The feeding means 11 may also be designed in other ways, but it is preferred that it is not pneumatically driven.

A supply system 12 for oxidant is branched in a first supply conduit 13, a second supply conduit 14 and a third supply conduit 15 for oxidant. A control device 19, which is conventional per se, is arranged to control the supply of oxidant through the supply system 12.

The first supply conduit 13 opens out into a first inlet 13a, arranged in the form of an opening surrounding the inlet opening 11a. The inlet opening 11a and the opening 13a debouche in one and the same burner pipe 16. In other words, the oxidant flows out through the opening 13a and the fuel is conveyed to the inlet opening 11a, and consequently oxidant and fuel meet in the burner pipe 16. According to a preferred embodiment, the opening 13a surrounds the inlet opening 11a in a symmetric manner, preferably in the form of a circular symmetric, narrow opening running peripherically along the inlet opening 11a.

According to another preferred embodiment, the opening 13a surrounds the inlet opening 11a in a manner which is not circular symmetric, so that the opening 13a is wider or larger at the lower part of the inlet opening 11a than at its upper part. This will permit a larger volume of oxidant per time unit to flow through the opening 13a at the lower part of the inlet opening 11a, which in turn makes it possible to maintain a lower feed velocity of the fuel and with the same direction of the resulting flame in the furnace 20.

The opening 13a may surround the inlet opening 11a completely, alternatively surround the inlet opening 11a in the form of a number of holes, apertures or the like, so that the opening 13a does not completely circumscribe the inlet opening 11a.

The burner pipe 16 runs up to a burner orifice 17, which faces out towards the combustion space 18. According to a very preferred embodiment, the length of the burner pipe 16 is between about 4 and 6 times the length of the inner diameter of the inlet opening 11a, preferably about 5 times. This relationship has proved to result in very attractive combustion properties in the burner device 10.

The oxidant flows out through the opening 13a with a high velocity, preferably with at least 100 m/s, but more preferably with at least the speed of sound. This creates an ejector action, bringing the solid phase fuel with it. Thereafter, the mixture of oxidant and fuel, which fuel is dispersed and transported by the help of the flow of oxidant, flows along the burner pipe 16 up to, and out through, the orifice 17.

Towards the end of the burner pipe 16, there is a gradually increasing constriction 16a, causing the inner diameter of the burner pipe 16 at the orifice 17 to be between 2% and 30% smaller than at the opening 13a. The dimensions for the inlet opening 11a, the opening 13a, the burner pipe 16 and the constriction 16a are adapted for the specific application, especially regarding the power of the burner device 10. Specifically, the constriction 16a is dimensioned for achieving a specific, final velocity with which the mixture of oxidant and fuel flows out through the orifice 17. Among other things, this velocity depends on the geometry of the combustion space 18 and desired combustion characteristics, and is chosen on the basis of present conditions and purposes.

Thus, the solid phase fuel is conveyed up to the combustion space 18 with no need for a separate, inert carrier gas. Instead, the oxidant itself is used as a carrier gas. Consequently, there is no need for heating any ballast material, which increases the efficiency of the burner device 10.

Furthermore, according to a preferred embodiment, the amount of oxidant per time unit that flows out through the opening 13a is understoichiometric in relation to the amount of fuel which is caused to be fed up to the inlet opening 11a. In other words, the combustion mixture flowing through the burner pipe 16 is understoichiometric.

As the mixture approaches the combustion space 18, it may ignite already in the burner pipe 16, because of the radiant heat from the combustion space 18. However, this combustion reaction will lead to the forming of CO, among other things and at the expense of the forming of $NO_x$, because of the above described understoichiometric relation and the fact that no additional nitrogen gas is supplied in the form of carrier gas.

According to a preferred embodiment, additional oxidant flows, via the second supply conduit 14, out through one or several other inlets 14a for oxidant. This or these other inlets 14a are arranged facing the combustion space 18 and in immediate vicinity of the burner orifice 17. The expression "in immediate vicinity of the burner orifice 17" herein means that the inlet or inlets 14a and the burner orifice 17 are arranged so near one another that the combustion mixture and the additional oxidant are intermixed essentially instantly to form a single, connected flame in the combustion space 18.

The amount additional oxidant flowing out through the inlet or inlets 14a is chosen so that the total amount supplied oxidant and the amount supplied fuel achieve stoichiometric equilibrium.

In the flame thus formed in the combustion space 18, fuel that has not yet been consumed in the combustion mixture flowing out from the burner pipe 16 is consumed, but so are also incompletely oxidised compounds such as CO. This combustion may take place at a comparatively low, controlled temperature, since certain recirculation with the furnace atmosphere arises in the flame because of the oxidant additionally supplied via the inlets 14a. This leads to an increase of the flame size and it becoming more diffuse, which lowers the maximum combustion temperature and thereby also the forming of $NO_x$ compounds.

Furthermore, it is preferred that the additional oxidant flows out through the inlet or inlets 14a with a velocity of at least the speed of sound. This leads to the recirculation strongly increasing in the combustion space 18, with the above indicated advantages.

According to yet another preferred embodiment, additional oxidant flows, via the third supply conduit 15, out through one or several, third inlets 15a for oxidant, arranged facing towards the combustion space 18 and arranged at a distance from the burner orifice 17.

The expression "at a distance from the burner orifice 17" herein means that the inlet or inlets 15a and the burner orifice 17 are arranged at such a distance from each other that the additional oxidant, flowing out from the inlet or inlets 15a, does not instantly mix with the combustion mixture flowing out through the burner orifice 17, but that these two or more streams are only mixed some distance out into the combustion space 18 as seen from the burner orifice 17.

In certain applications, it is preferred that the inlet or inlets 15a are arranged essentially parallel to the longitudinal axis of the burner pipe 16.

In other applications, especially where the burner device 10 is comparatively large and the furnace space 21 is comparatively limited, it is preferred that the inlet or inlets 15a are arranged so that the additional oxidant flows out into the combustion space 18 at an angle in comparison to the direction in which the combustion mixture flows out from the orifice 17, so that the streams obtain a common point of intersection some distance out from the orifice 17.

According to a preferred embodiment, the inlet or inlets 15a are so positioned, and angled in relation to the longitudinal axis of the burner pipe 16, that a single connected flame is formed in the combustion space 18.

Moreover, it is preferred that the additional oxidant flows out through the inlet or inlets 15a at a velocity of at least the speed of sound. This leads to recirculation being strongly increased in the combustion space 18, in applicable cases in and around the point at which the streams of combustion mixture and additional oxidant meet. As a consequence, the flame becomes even more diffuse, with lower top temperatures, and in this way it is possible to obtain flameless combustion, something which among other things results in a smaller production of $NO_x$ compounds. Also, the heat from the combustion reaction is distributed more evenly in the space 18.

It is also possible to let additional oxidant flow out through a combination of one or several inlets 14a, arranged in immediate vicinity of the burner orifice 17, at the same time as one or several inlets 15a, arranged at a distance from the burner orifice 17, as long as the totally supplied oxidant essentially stands in stoichiometric equilibrium with the supplied fuel. The relation between the amount of oxidant in the oxidant streams through the inlets 14a, 15a, the mutual geometrical position of the inlets and their respective slants, their respective flow velocities, etc., are determined from case to case depending on the present conditions and purposes.

In case a smaller, better defined flame is desired, the inlet or inlets 14a are used primarily. If, on the other hand, a flameless combustion is desired, the inlet or inlets 15a are used primarily.

It is also possible to let the supply conduits 13, 14, 15 be connected to one or several supply systems, whereby different types of oxidant may be supplied through the opening 13a and the additional inlets 14a, 15a, respectively. In this case, the control device 19 may be arranged to control the supply of oxidant to the various supply conduits 13, 14, 15, alternatively several different control devices 19 may be used in parallel.

By the use of a burner device 10 according to the present invention, it is possible to make use of a gas with larger oxygen content than for example air as oxidant, without this resulting in too high local combustion temperatures. Thus, it is preferred that the oxidant is comprised of at least 80 percentages by weight oxygen, more preferably at least 95 percentages by weight oxygen. This results in the efficiency of the burner device 10 increasing. Despite this, the amount of NO$_x$ formed is, according to what has been said, not increased, since the combustion temperature is held down by the aid of the recirculation in the combustion space 18 described above.

Above, preferred embodiments have been described. However, it is apparent to the skilled person that many modifications may be made to the described embodiments without departing from the idea of the invention. Therefore, the invention shall not be limited to the described embodiments, but may be varied within the frame of the appended claims.

The invention claimed is:

1. A method for combusting a solid phase fuel, where the fuel is fed to an inlet opening (11a) of a burner device (10) by way of a non-pneumatic feeding means (11), comprising:
    flowing oxidant through a first inlet (13a) of the burner device (10) with a velocity of at least 100 m/s, through a burner pipe (16) of the burner device (10), and out through a burner orifice (17) at an end of the burner pipe (16) to a combustion space (18), so that the oxidant by ejector action causes the fuel to be conveyed through the burner pipe (16) and out through the burner orifice (17),
    wherein the first inlet (13a) is arranged as one of an opening that completely surrounds the inlet opening (11a) or a plurality of holes surrounding the inlet opening (11a),
    wherein the inlet opening (11a) and the first inlet (13a) debouche in one and the same burner pipe (16),
    wherein an amount of oxidant per time unit flowed out through the first inlet (13a) is under stoichiometric in relation to an amount of fuel fed to the inlet opening (11a), and
    wherein the oxidant comprises at least 80 percentages by weight oxygen.

2. The method according to claim 1, wherein the opening (13a) is caused to surround the inlet opening (11a) in a circular symmetric manner.

3. The method according to claim 1, wherein the opening (13a) is caused to surround the inlet opening (11a) in a way which is not circular symmetric, so that the opening (13a) is wider or larger at the lower part of the inlet opening (11a) than at the upper part of the inlet opening (11a).

4. The method according to claim 1, wherein the diameter of the inlet opening (11a) is between ⅙ and ¼ of the length of the burner pipe (16) between the inlet opening (11a) and the burner orifice (17).

5. The method according to claim 1, wherein the oxidant is caused to flow through the first inlet (13a) at a velocity of at least the speed of sound.

6. The method according to claim 1, wherein the burner pipe (16) is caused to be designed with a constriction (16a), so that the inner diameter of the burner pipe (16) at the burner orifice (17) is between 2% and 30% smaller than at the first inlet (13a).

7. The method according to claim 1, wherein additional oxidant is caused to flow, via a second, additional supply conduit (14), out through a second and additional inlet (14a) for oxidant, arranged facing the combustion space (18) and in immediate vicinity of the burner orifice (17).

8. The method according to claim 1, wherein additional oxidant is caused to flow, via a third, additional supply conduit (15), out through a third and additional inlet (15a) for oxidant, arranged facing the combustion space (18) and at a distance from the burner orifice (17).

9. The method according to claim 8, wherein the third inlet (15a) for oxidant is caused to be arranged at an angle in relation to the direction in which the outflowing mixture of fuel and oxidant may flow out of the burner orifice (17), so that the flow of oxidant out from the third inlet (15a) is caused to meet the stream of the mixture at a certain distance from the burner orifice (17).

10. The method according to claim 7, wherein at least one stream of additional oxidant is caused to flow out from an additional inlet (14a; 15a) with a velocity of at least the speed of sound.

11. A device for combustion of a fuel in solid phase, comprising:
    a burner device (10) having a first supply conduit (13), a first inlet (13a) for oxidant, and an inlet opening (11a) configured to receive fuel from a non-pneumatic feeding means (11); and
    a supply system (12; 19) arranged to supply oxidant to the burner device (10) via the first supply conduit (13) and the first inlet (13a) for oxidant,
    wherein the first inlet (13a) for oxidant is arranged in the form of an opening completely surrounding the inlet opening (11a), through which the supply system (12; 19) is arranged to supply the oxidant in a stream at a velocity of at least 100 m/s through a burner pipe (16) and out through a burner orifice (17) to a combustion space (18) thereby to convey the fuel, by ejector action caused by the stream of oxidant, through the burner pipe (16) and out through the burner orifice (17),
    wherein the inlet opening (11a) and the opening of the first inlet (13a) debouche in one and the same burner pipe (16),
    wherein an amount of oxidant per time unit flowed out through the first inlet (13a) is under stoichiometric in relation to an amount of fuel fed to the inlet opening (11a), and
    wherein the oxidant comprises at least 80 percentages by weight oxygen.

12. The device according to claim 11, wherein the diameter of the inlet opening (11a) is between ⅙ and ¼ of the length of the burner pipe (16) between the inlet opening (11a) and the burner orifice (17).

13. The device according to claim 11, wherein the supply system (12; 19) is arranged to control the amount of oxidant per time unit which flows out through the first inlet (13a) so that this is under stoichiometric in relation to the amount of fuel which is fed to the inlet opening (11a), and in that the supply system (12; 19) is arranged to supply an additional stream of oxidant, via at least one additional supply conduit (14; 15), out through at least one additional inlet (14a; 15a) for oxidant, arranged facing the combustion space (18), so that the total amount of supplied oxidant stoichiometrically can correspond to the amount of supplied fuel.

14. The device according to claim 13, wherein an additional inlet (14a; 15a) for oxidant is arranged at an angle in relation to the direction for the outflowing mixture of fuel and oxidant, so that the stream of oxidant from the additional inlet (14a; 15a) is arranged to meet the stream of the mixture at a certain distance from the burner orifice (17).

15. The device according to claim 11, wherein the burner pipe (16) is arranged with a constriction (16a), so that the inner diameter of the burner pipe (16) at the burner orifice (17) is between 2% and 30% smaller than at the first inlet (13a).

16. The device according to claim 12, wherein the supply system (12; 19) is arranged to control the amount of oxidant per time unit which flows out through the first inlet (13a) so that this is under stoichiometric in relation to the amount of fuel which is fed to the inlet opening (11a), and in that the supply system (12; 19) is arranged to supply an additional stream of oxidant, via at least one additional supply conduit (14; 15), out through at least one additional inlet (14a; 15a)

for oxidant, arranged facing the combustion space (18), so that the total amount of supplied oxidant stoichiometrically can correspond to the amount of supplied fuel.

17. A device for combustion of a fuel in solid phase, comprising:
- a burner device (10) having a first supply conduit (13), a first inlet (13*a*) for oxidant, and an inlet opening (11*a*) configured to receive fuel from a non-pneumatic feeding means (11); and
- a supply system (12; 19) arranged to supply oxidant to the burner device (10) via the first supply conduit (13) and the first inlet (13*a*) for oxidant,
- wherein the first inlet (13*a*) for oxidant is formed of a plurality of holes surrounding the inlet opening (11*a*), through which the supply system (12; 19) is arranged to supply the oxidant in a stream at a velocity of at least 100 m/s through a burner pipe (16) and out through a burner orifice (17) to a combustion space (18) thereby to convey the fuel, by ejector action caused by the stream of oxidant, through the burner pipe (16) and out through the burner orifice (17),
- wherein the inlet opening (11*a*) and the opening of the first inlet (13*a*) debouche in one and the same burner pipe (16),
- wherein an amount of oxidant per time unit flowed out through the first inlet (13*a*) is under stoichiometric in relation to an amount of fuel fed to the inlet opening (11*a*), and
- wherein the oxidant comprises at least 80 percentages by weight oxygen.

* * * * *